United States Patent
Wu et al.

(10) Patent No.: US 8,565,072 B2
(45) Date of Patent: Oct. 22, 2013

(54) METHOD AND A SYSTEM FOR PREVENTING A NETWORK STORM FROM PRESENTING IN A MULTI-RING ETHERNET

(75) Inventors: Shaoyong Wu, Shenzhen (CN); Hong Shao, Shenzhen (CN); Tao Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 265 days.

(21) Appl. No.: 12/921,435

(22) PCT Filed: Jan. 5, 2009

(86) PCT No.: PCT/CN2009/070027
§ 371 (c)(1),
(2), (4) Date: Nov. 30, 2010

(87) PCT Pub. No.: WO2009/111954
PCT Pub. Date: Sep. 17, 2009

(65) Prior Publication Data
US 2011/0116365 A1    May 19, 2011

(30) Foreign Application Priority Data
Mar. 10, 2008    (CN) .......................... 2008 1 0006577

(51) Int. Cl.
*G01R 31/08* (2006.01)
(52) U.S. Cl.
USPC ............ 370/222; 370/226; 370/242; 370/245
(58) Field of Classification Search
None
See application file for complete search history.

(56) References Cited

U.S. PATENT DOCUMENTS

| | | | |
|---|---|---|---|
| 6,766,482 B1 * | 7/2004 | Yip et al. ...................... | 714/717 |
| 7,558,205 B1 * | 7/2009 | Moncada-Elias et al. .... | 370/236 |
| 7,898,942 B2 * | 3/2011 | Takagi et al. ................. | 370/222 |
| 2003/0165119 A1 | 9/2003 | Hsu et al. | |
| 2004/0223503 A1 * | 11/2004 | Lynch et al. .................. | 370/404 |
| 2005/0207348 A1 * | 9/2005 | Tsurumi et al. .............. | 370/241 |

(Continued)

FOREIGN PATENT DOCUMENTS

| | | |
|---|---|---|
| CN | 1976311 A | 6/2007 |
| CN | 101064632 A | 10/2007 |
| EP | 1575221 A1 | 9/2005 |
| WO | 2007125111 A1 | 11/2007 |

OTHER PUBLICATIONS

Extended European Search Report for EP Application No. 09718861.9 mailed Feb. 13, 2012.

*Primary Examiner* — Donald Mills
(74) *Attorney, Agent, or Firm* — Bright IP Law Offices

(57) ABSTRACT

A method and a system for preventing a network storm from presenting in a multi-ring Ethernet, the method comprises: when a link in the multi-ring Ethernet is failed, at most one ring protecting link is unblocked, the ring protecting link and the failed link being in a same logic area. Wherein each link in the multi-ring Ethernet belongs uniquely to one logic area, when a link in the multi-ring Ethernet is failed, a master node of a logic area to which the failed link belongs unblocks a ring protecting link; or each link in the multi-ring Ethernet respectively belongs to one or more logic areas, each logic area is set with a priority, when a link in the multi-ring Ethernet is failed, the ring protecting link of one logic area which contains the failed link and has a highest priority is unblocked by the master node of the logic area.

15 Claims, 5 Drawing Sheets

(56) References Cited

U.S. PATENT DOCUMENTS

2005/0226265 A1* 10/2005 Takatori .................. 370/452
2006/0215546 A1   9/2006 Tochio
2006/0250969 A1  11/2006 Florit et al.
2007/0104093 A1*  5/2007 Li et al. .................. 370/223
2009/0296569 A1* 12/2009 Ramalho Ribeiro Dos Santos
                          et al. ............................ 370/222

* cited by examiner

METHOD AND A SYSTEM FOR PREVENTING A NETWORK STORM FROM PRESENTING IN A MULTI-RING ETHERNET

FIELD OF THE INVENTION

The present invention relates to data communication field, in particular to a method and a system for preventing network failure from presenting in a multi-ring Ethernet.

BACKGROUND OF THE INVENTION

With the development of the IP network toward the direction of carrying multiple services, the services such as the Next Generation Network ("NGN" for short), the Internet Protocol Television ("IPTV" for short) put forward higher and higher demands on the reliability and real-time of the network, and the traditional ring network protection Spanning Tree Protocol ("STP" for short) technology of the second-layer network of the access network gradually cannot satisfy the requirements of fast convergence and link switching.

RFC3619 has defined an Ethernet automatic protection switching method. The method solves the problem of slow convergence of network failure of the Ethernet device in a ring-type network topology, and the convergence time can be limited to be within 50 ms by using the method. A RFC3619 ring is formed by connecting a plurality of nodes, wherein one node is defined as a master node, the master node is also called as a ring protecting link affiliation node in some technologies, and other nodes are defined as transit nodes. The two ports of the master node on the ring are defined as a primary port and a slave port respectively, and the link directly connected to the slave port may be called as ring protecting link. The ring protecting link is a link on the ring where the service communication data is blocked when there is not any failure or request in the Ethernet ring so as to prevent a closed ring. When any of the links on the ring is not failed, the master node blocks the service data forwarding function of the slave port, i.e., the master node blocks the ring protecting link, such that the service data cannot pass through the slave port of the master node, which ensures that the service VLAN (Virtual Local Area Network) cannot form a closed loop and prevents the "broadcast storm" caused by the closed loop. When a link on the ring is failed, the master node unblocks the service data forwarding function of the slave port, i.e., the master node unblocks the ring protecting link, such that the service data can pass through the slave port of the master node, which ensures the connectivity of the service data, and the interruption will not occur.

FIG. 1a is a topological diagram of a RFC3619 ring, formed by nodes S1, S2, S3 and S4, wherein the master node (MASTER) is S2, and other nodes S1, S3 and S4 are transit nodes (TRANSIT). The two ports of the master node S2 on the ring are respectively the primary port and the slave port, wherein port 2 is the primary port (P) and port 1 is the slave port (S). As shown in FIG. 1b, when the states of the links on the ring are in good condition, the master node S2 blocks the service data forwarding function of the slave port 1 to prevent a closed loop from presenting in the network to form the "network storm"; and as shown in FIG. 1c, when a link on the ring is failed, the master node S2 unblocks the service data forwarding function of the slave port 1 to make the service data re-connected.

Though the RFC3619 solves the problem of fast convergence of a single physical ring network very well, the actual networking is usually quite complicated and a situation exits that a plurality of physical rings are tangent with each other. As shown in FIG. 2a, a topological structure is shown that a plurality of RFC3619 rings are intersected, S1, S2, S3, S4 in the figure form ring 1, in which S2 is the master node, and port 2 of node S2 is the primary port, port 1 is the slave port; S3, S4, S5, S6 form ring 2, in which S6 is the master node, and port 2 of node S6 is the primary port, and port 1 is the slave port. When any of the links on the rings is not failed, the master nodes S2 and S6 respectively block their respective slave ports. When the shared path of the two rings, i.e., the link between nodes S3 and S4, is failed, as shown in FIG. 2b, a link on ring 1 is failed, the master node S2 unblocks the slave port, and the link in ring 2 is failed, the master node S6 unblocks the slave port, then a closed loop of "super loop" appears on the whole ring, the "network storm" is formed and the network is failed.

The same problem will occur when the other Ethernet ring protection technologies similar to the RFC3619 for protecting the single ring is applied to multiple rings, i.e., the failure of the shared path may make a plurality of ring protecting links unblocked, which finally causes the "super loop" to appear on the whole ring and forms the network failure of "network storm".

In the present text, a port being blocked means that the port is configured not to forward the service data when it is blocked, and a port being unblocked means that the port is configured to forward the service data when it is unblocked, wherein the forwarding of the protocol frame of Ethernet ring protection will not be affected no matter the port is blocked or unblocked. A link being blocked means that one of two adjacent ports of the link is blocked or both ports are blocked, and the service data cannot be forwarded by one of the two adjacent ports of the link and thus cannot pass through the blocked link; and a link being unblocked means that both the two adjacent ports of the link are unblocked, and the service data may be forwarded by the two adjacent ports of the link.

SUMMARY OF THE INVENTION

The technical problem to be solved by the present invention is to provide a method and a system for preventing a network storm from presenting in an Ethernet ring that can effectively prevent the network storm from presenting in the Ethernet ring, and improve the anti-fault capability of a multi-ring Ethernet.

In order to solve the above technical problem, the present invention provides a method for preventing a network storm from presenting in a multi-ring Ethernet, comprising: when a link in the multi-ring Ethernet is failed, at most one ring protecting link is unblocked, the ring protecting link and the failed link being in a same logic area.

Further, each link in the multi-ring Ethernet belongs uniquely to one logic area, when a link in the multi-ring Ethernet is failed, a master node of a logic area to which the failed link belongs unblocks a ring protecting link.

Further, upon dividing logic areas, the multi-ring Ethernet is firstly divided into a plurality of single rings, a shared link between adjacent single rings is assigned to one single ring thereof, wherein the closed single ring is a master ring, the unclosed single ring is a sub ring, and both the master ring and the sub ring are called logic areas.

Further, each link in the multi-ring Ethernet respectively belongs to one or more logic areas, each logic area is set with a priority, when a link in the multi-ring Ethernet is failed, the ring protecting link of one logic area which contains the failed link and has a highest priority is unblocked by the master node of the logic area.

Further, each single ring in the multi-ring Ethernet is one logic area, and each logic area has a different priority.

Further, when the failed link is the ring protecting link, the master node of the logic area to which the failed link belongs does not perform any operation.

In order to solve the above technical problem, the present invention further provides a system for preventing a network storm from presenting in a multi-ring Ethernet, comprising a plurality of nodes and all nodes are connected with each other by links, wherein each node records a logic area to which the node belongs;

when a link in the multi-ring Ethernet is failed, a master node of the logic area to which the failed link belongs unblocks at most one ring protecting link in the logic area.

Further, each link in the multi-rings Ethernet belongs uniquely to one logic area, the two nodes connected by the link record the logic areas to which they respectively belong; when a link in the multi-ring Ethernet is failed, the master node of the logic area to which the failed link belongs unblocks the ring protecting link.

Further, upon dividing logic areas, the multi-ring Ethernet is firstly divided into a plurality of single rings, a shared link between adjacent single rings is assigned to one single ring thereof, wherein the closed single ring is a master ring, the unclosed single ring is a sub ring, and both the master ring and the sub ring are called logic areas.

Further, each link in the multi-ring Ethernet respectively belongs to one or more logic areas, each logic area is set with a priority, the two nodes connected by the link record the logic areas to which they belong and the priorities of the logic areas respectively; when a link in the multi-ring Ethernet is failed, the master node of one logic area which contains the failed link and has a highest priority unblocks the ring protecting link of the logic area.

Further, each single ring in the multi-ring Ethernet is one logic area, and each logic area has a different priority.

The method and the system described in the present invention is applicable not only to a simple multi-ring network but also to a complicated multi-ring network, which ultimately solves the failure of the "super loop" caused by a plurality of ring protecting links being unblocked due to the failure of one link, and improves the anti-fault capability of the multi-ring Ethernet.

DETAILED DESCRIPTION OF PREFERABLE EMBODIMENTS

It can be known by analyzing the prior art that the reason of the presenting of the failure lies in that the logic areas of multi-ring Ethernet protection is not clear. A shared path is assigned to a plurality of Ethernet ring protecting areas, and when the shared path is failed, a plurality of Ethernet protecting areas to which the shared path belongs unblock the initially blocked ring protecting links, which results in a "super loop".

The essence of the present invention lies in that when a link in the multi-ring Ethernet is failed, at most one ring protecting link is unblocked, and the ring protecting link and the failed link are in the same logic area.

Any link in the multi-ring Ethernet belongs uniquely to one logic area, or the links in the multi-ring Ethernet simultaneously belong to a plurality of logic areas, but each logic area has a different priority.

Figure 1A:
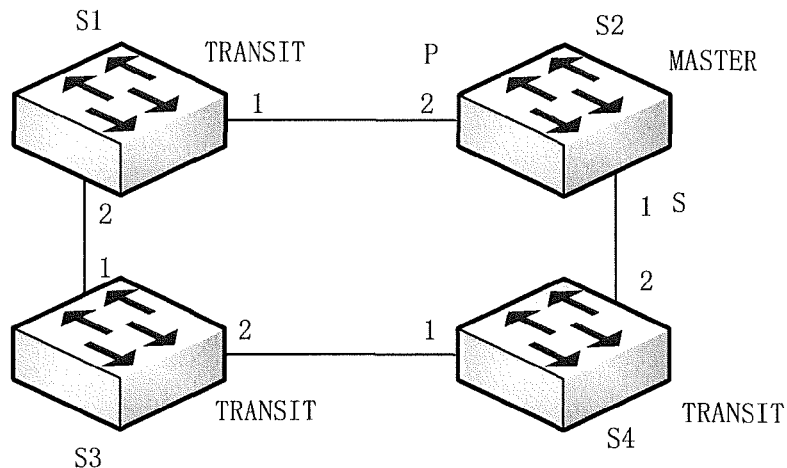
FIG. 1a is a topological diagram of an RFC3619 ring.
Figure 1B:
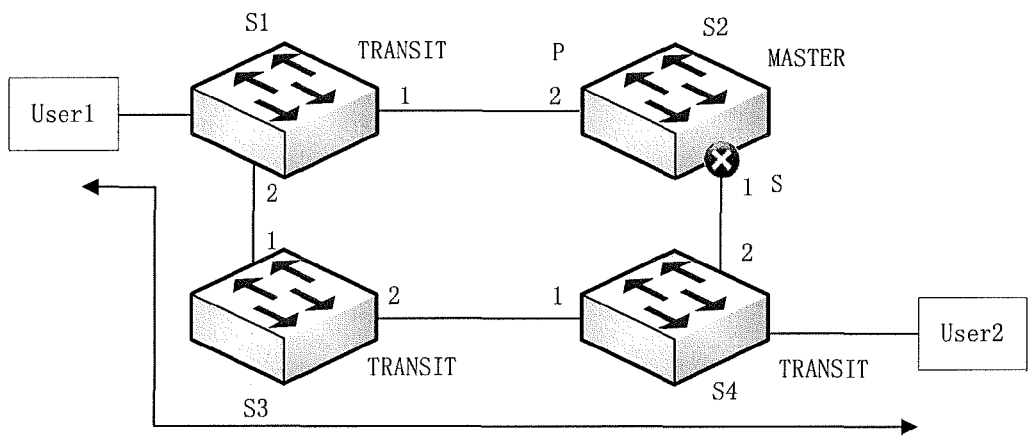
FIG. 1b is a topological diagram when any link on the RFC3619 ring is not failed.
Figure 1C:
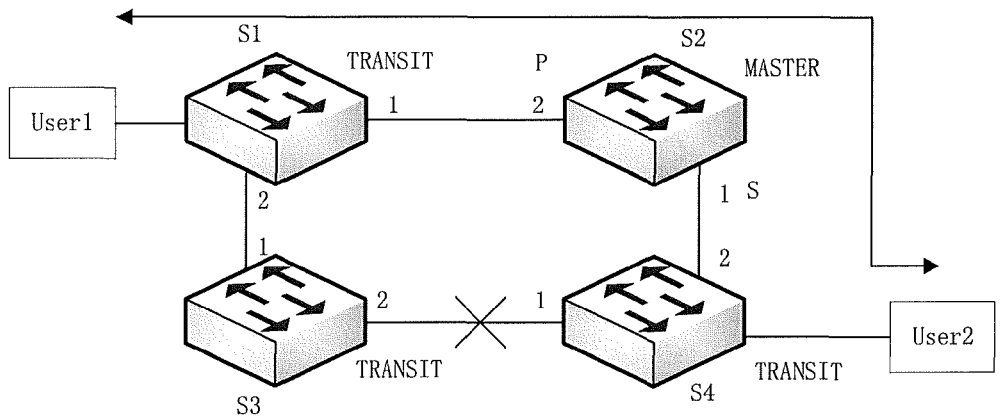
FIG. 1c is a topological diagram when a link on the RFC3619 ring is failed.
Figure 2A:
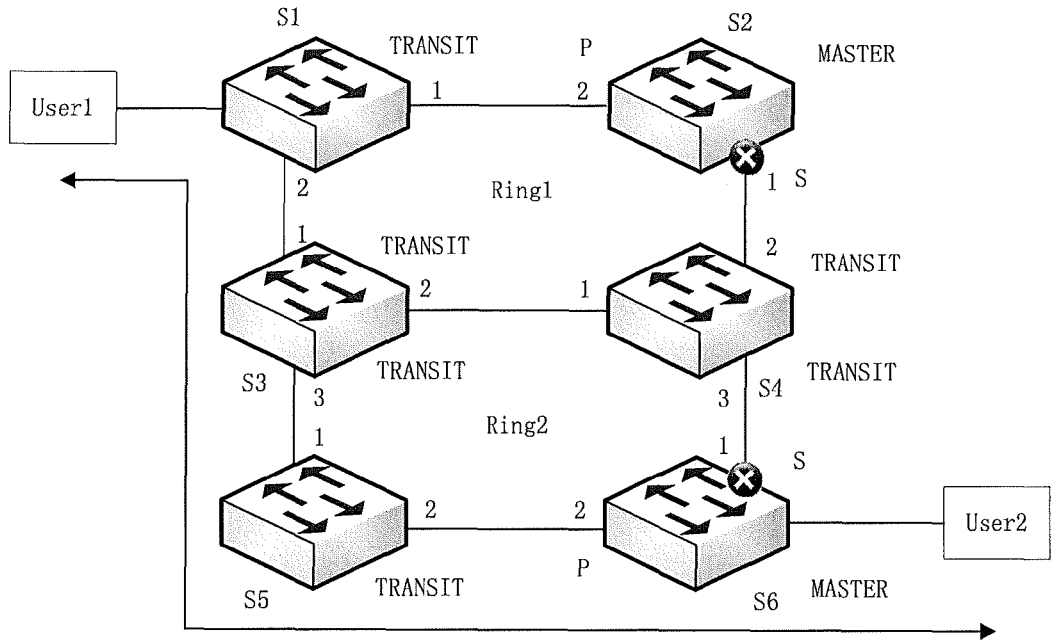
FIG. 2a is a topological diagram when a plurality of RFC3619 rings is intersected.
Figure 2B:
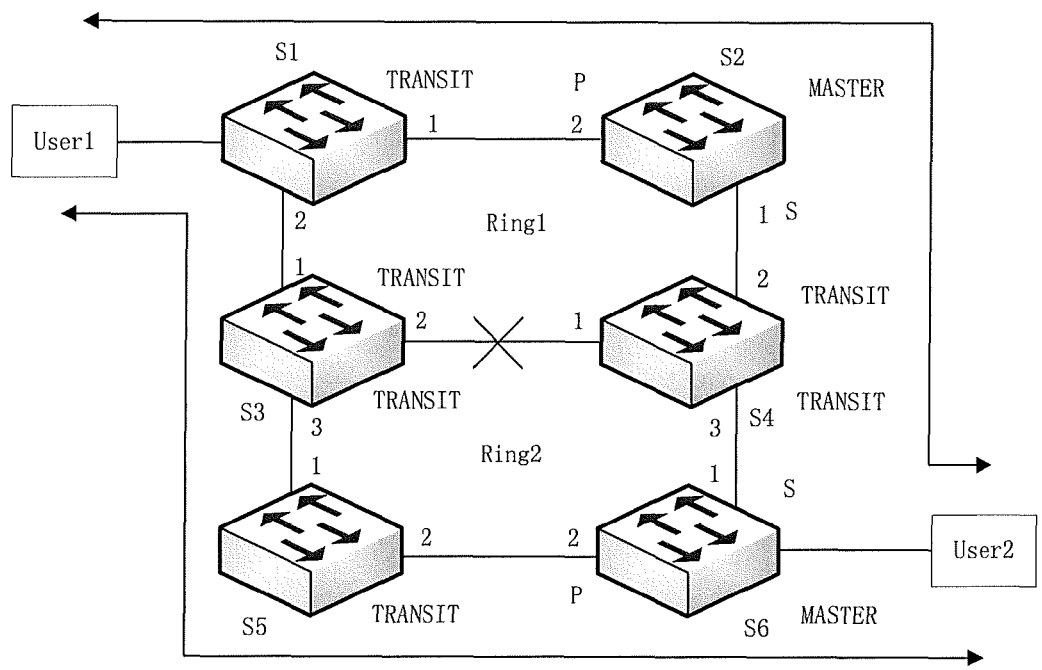
FIG. 2b is a topological diagram when the shared link of a plurality of RFC3619 rings is failed.
Figure 3:
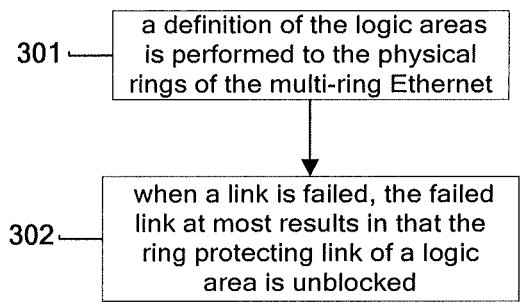
FIG. 3 is a flow chart of the implementation for preventing a network storm from presenting in the multi-ring Ethernet.

As shown in FIG. 3, firstly, a definition of the logic areas is performed to the physical rings of the multi-ring Ethernet so that one link in the multi-ring Ethernet is uniquely protected by one logic area logically, or that the shared link belongs to a plurality of logic areas, but the priorities of the logic areas are different, and the link is protected by the logic area with the highest priority (step 301). In such a way, when a link is failed, the failure of the link at most results in that the ring protecting link of the logic area to which the link belongs is unblocked, and if the failed link belongs to a plurality of logic areas, at most the ring protecting link of the logic area which the failed link belongs to and has the highest priority is unblocked (step 302), but the situation of the "super loop", which is caused by the unblockings of the ring protecting links of a plurality of logic areas due to the failure of one link since the link belongs to a plurality of logic areas, will not occur.

When the definition of the logic areas is performed to the physical rings of the multi-ring Ethernet, a single ring is selected from the Ethernet multiple rings as the first area; according to the principle for defining the logic areas of the Ethernet multiple rings, one single ring or an incomplete single ring is selected from the Ethernet multiple rings as the second area, and the other areas are sequentially selected in the same manner. In practical implementation, the multi-ring Ethernet is divided into a plurality of single rings, and the shared link between the adjacent single rings is assigned to one of the single rings, the closed single ring is the master ring, the unclosed single ring is the sub ring, and both the master ring and the sub ring are called as logic areas. Each logic area has a master node for controlling the unblocking and closing of the ring protecting link in the logic area.

The principle for defining the logic areas is that, two areas will not have any shared path, and if a shared path appears, the shared path will be assigned to one of the areas. For example, if the second area and the first area have a shared path, the shared path belongs to the first area, and the second area is the aggregation of the paths without the shared path, and the intersecting nodes which connect the first area and the second area together belong to both the first area and the second area.

However, the sequence for selecting the areas is not necessarily based on the time or the order. The second area may also be firstly selected, and then the first area is selected.

After the logic areas of the Ethernet multiple rings is defined, each area is a logically complete single ring (i.e., single-ring-shaped) or logically incomplete single ring (i.e., chain-shaped). Each link has a logic area to which it uniquely belongs. For the nodes which connect a plurality of logic areas, they belong to a plurality of areas. One logic area only has one ring protecting link.

In other embodiments, each link may also belong to one or more areas as in the prior art, however, each area should be different from each other in priority. When a link is failed, and the link belongs to a plurality of logic areas, only the ring protecting link in the logic area with the highest priority is unblocked, so that the situation of the "super loop" due to the unblocking of the ring protecting links of a plurality of logic areas will not occur.

The system that accomplishes the above method for preventing the network storm from presenting in the multi-ring Ethernet comprises a plurality of nodes, and all nodes are connected to each other by links, and each node records the logic area to which it belongs; and when a link in the multi-ring Ethernet is failed, the master node of the logic area to which the failed link belongs unblocks at most one ring protecting link in the logic area.

In practical implementation, each link in the multi-ring Ethernet may uniquely belong to one logic area, and the two nodes connected by the link record the logic areas to which they respectively belong; and when a link in the multi-ring Ethernet is failed, the master node of the logic area to which the failed link belongs unblocks the ring protecting link.

Possibly, each link in the multi-ring Ethernet respectively belongs to one or more logic areas. Each logic area is set with a priority. The two nodes connected by the link record the logic areas to which they belong and the priorities of the logic areas respectively; and when a link in the multi-ring Ethernet is failed, the master node of a logic area which contains the failed link and has the highest priority unblocks the ring protecting link of the logic area.

The exemplary embodiments will be described in detail hereinafter without unduly limiting the present invention.

The definition of the logic areas of the Ethernet multiple rings in the first and the second embodiments use the method of master-sub ring; the third embodiment uses the defining method of the sub ring; and the fourth embodiment uses the defining method of the priorities of the areas further diversified in the present invention.

The First Embodiment

Figure 4A:
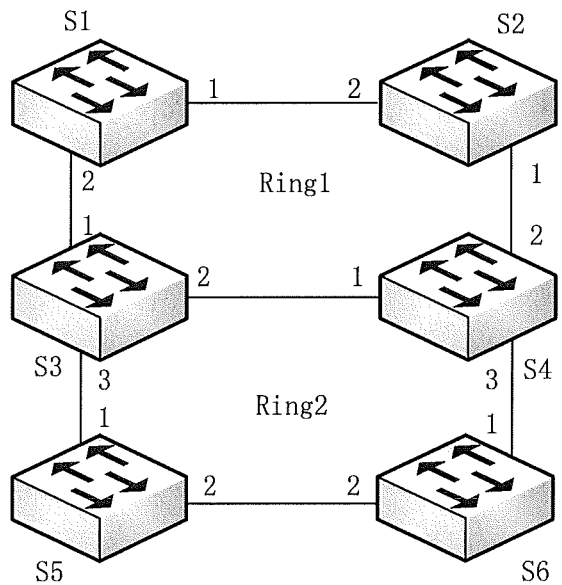
FIGS. 4a and 4b are the specific applications of the first embodiment of the present invention using the method of logic definition of master-sub ring in a topological structure of two intersected rings.
Figure 4:
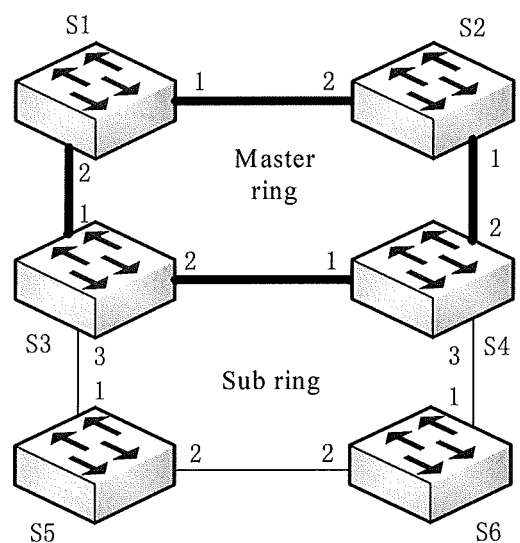

The implementation Embodiment 1 of the present invention is a topology of two intersected rings as shown in FIG. 4a. In the two rings, ring 1 is selected as the master ring, the master ring may also be called as ring, i.e., the first logic area, the logic area of the master ring includes S1-S2-S4-S3-S1 which is a logically complete single ring; the part of ring 2 without the shared path with ring 1 is selected as the sub-ring, i.e., the second area. The logic area of the sub-ring includes S3-S5-S6-S4 which is not a logically complete single ring but is chain-shaped, wherein the shared link between ring 1 and ring 2, i.e., the link between S3 and S4, belongs to the master ring but not to the sub-ring, while the nodes S3 and S4 belong simultaneously to the master ring and the sub-ring, as shown in FIG. 4b. After defining the logic areas of the Ethernet multiple rings in such a way, each link is protected by a unique logic area. When the shared link of two rings, i.e., the link between S3 and S4, is failed, since the link belongs to the master ring but not to the sub-ring, it will only result in that the ring protecting link of the master ring is unblocked, but will not make the ring protecting link of the sub ring unblocked which leads to a "super loop".

The Second Embodiment

Figure 5A:
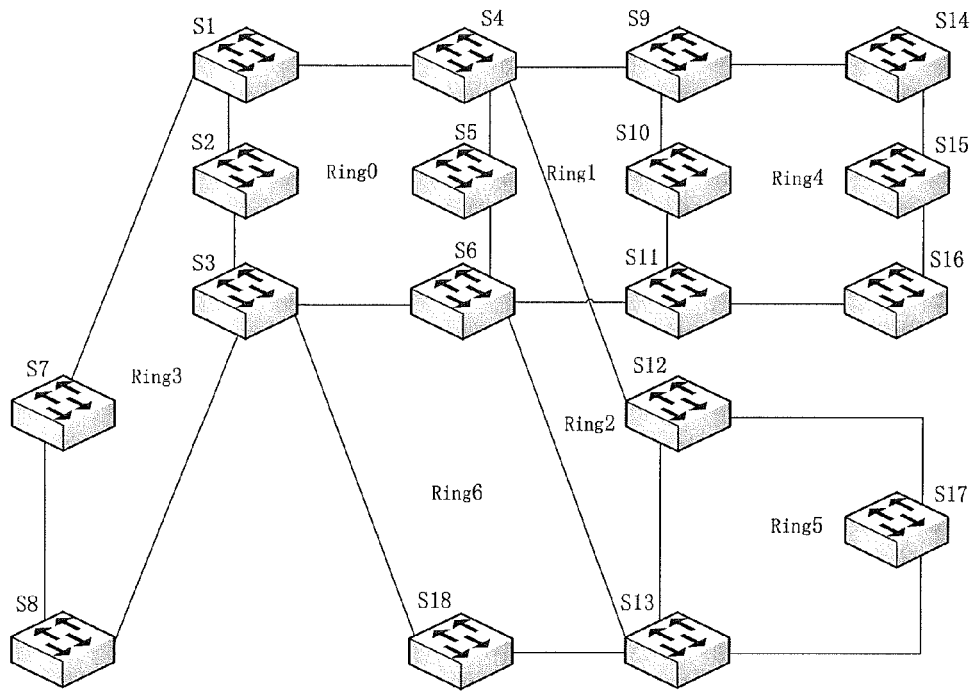
FIGS. 5a and 5b are the specific applications of the second embodiment of the present invention using the method of logic definition of master-sub ring in a topological structure of complicated multiple rings.
Figure 5B:
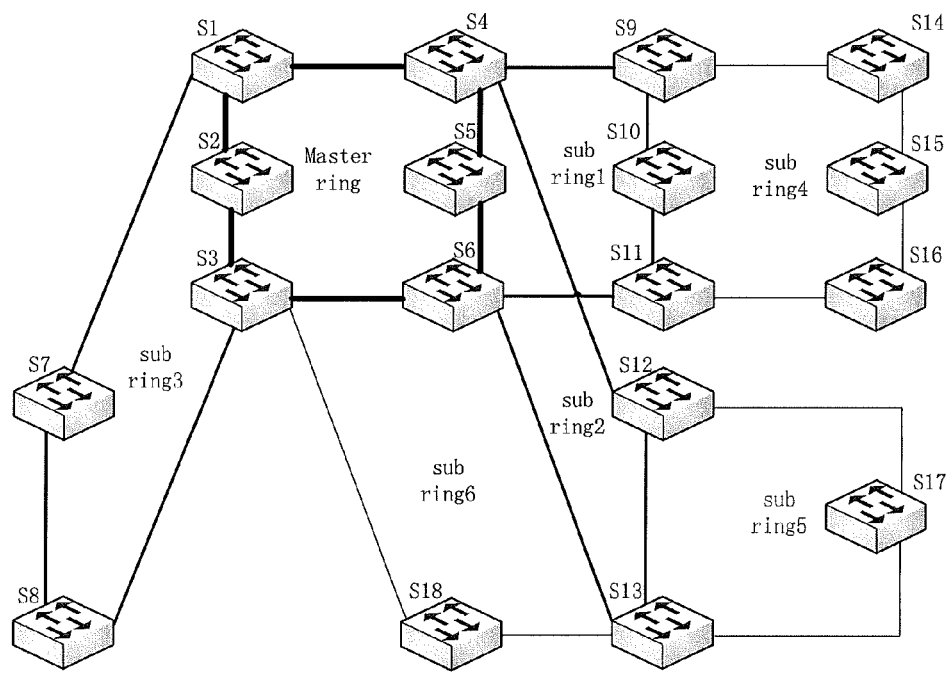

The implementation Embodiment 2 of the present invention is a complicated topology of intersected rings as shown in FIG. 5a. As shown in FIG. 5b, ring 0 is selected as the master ring, the master ring may also be called as ring, i.e., the first logic area, the master ring is S1-S2-S3-S6-S5-S4-S1; the second logic area, i.e., sub ring 1, is defined, sub ring 1 is the part of ring 1 without the shared path with the master ring, i.e., S4-S9-S10-S11-S6; the third logic area, i.e., sub ring 2, is defined, sub ring 2 is the part of ring 2 without the shared path with the master ring, i.e., S4-S12-S13-S6; the fourth logic area, i.e., sub ring 3, is defined, sub ring 3 is the part of ring 3 without the shared path with the master ring, i.e., S1-S7-S8-S3; the fifth logic area, i.e., sub ring 4, is defined, sub ring 4 is the part of ring 4 connected onto sub ring 1, i.e., S9-S14-S15-S16-S11; the sixth logic area, i.e., sub ring 5, is defined, sub ring 5 is the part of ring 5 connected onto-sub ring 2, i.e., S12-S17-S13; the seventh logic area, i.e., sub ring 6, is defined, sub ring 6 is the part of ring 6 connected onto-sub ring 2, i.e., S3-S18-S13, the shared path part between ring 6 and the master ring and between ring 6 and sub ring 2 does not belong to sub ring 6. After defining the logic areas of the Ethernet multiple rings in this way, each link is protected by a unique logic area. When the shared path of the rings, for instance, the link between S4 and S5, is failed, since the link belongs to the master ring but not the sub ring 1 or 2, it will only result in that the ring protecting link of the master ring is unblocked, but will not make the ring protecting links of the sub rings unblocked which leads to a "super loop".

In particular, assume that in the master ring S1 is the master node, the master node may also be called as a ring protection link affiliation node, S1-S4 is the ring protecting link; that in sub ring 1 S9 is the master node, S4-S9 is the ring protecting link; that in sub ring 2 S12 is the master node, S4-S12 is the ring protecting link; that in sub ring 3 S7 is the master node, S1-S7 is the ring protecting link; that in sub ring 4 S14 is the master node, S9-S14 is the ring protecting link; that in sub ring 5 S17 is the master node, S13-S17 is the ring protecting link; and that in sub ring 6 S18 is the master node, S18-S13 is the ring protecting link.

When all the links are normal, and there are service data being transmitted from node S1 to S17, the unique path for transmitting the service data is S1-S2-S3-S6-S13-S12-S17.

Assume that link S3-S6 is failed, the adjacent nodes of the failed link will send message to the master node to notify the link failure, if the master node judge that the failed link belongs to the same logic area as the master node, the slave port will be unblocked, i.e., the ring protecting link S1-S4 is unblocked, at this moment, the unique path for transmitting the service data from S1 to S17 is S1-S4-S5-S6-S13-S12-S17.

Assume that link S6-S13 is failed, the link belongs uniquely to sub ring 2, the master node S12 of sub ring 2 unblocks the ring protecting link S4-S12, at this moment, the unique path for transmitting the service data from S1 to S17 is S1-S2-S3-S6-S5-S4-S12-S17.

Assume that link S13-S17 is failed, since the link itself is a ring protecting link, at this moment, no link is needed to be unblocked, and the path for transmitting the service data from S1 to S17 is the same as when the link is normal.

It can be seen that one logic area only has one ring protecting ring. When a link is failed, at most one ring protecting link is unblocked, and there is uniquely one link communicating between the two nodes which transmit the service data, and a super loop will not occur, so that the formation of the network storm is avoided effectively, and the anti-fault capability of the multi-ring Ethernet is improved. When a plurality of links are failed, only one ring protecting link is unblocked, that is to say, when a link in one logic area is failed, at most one ring protecting link is unblocked.

The Third Embodiment

Figure 6:
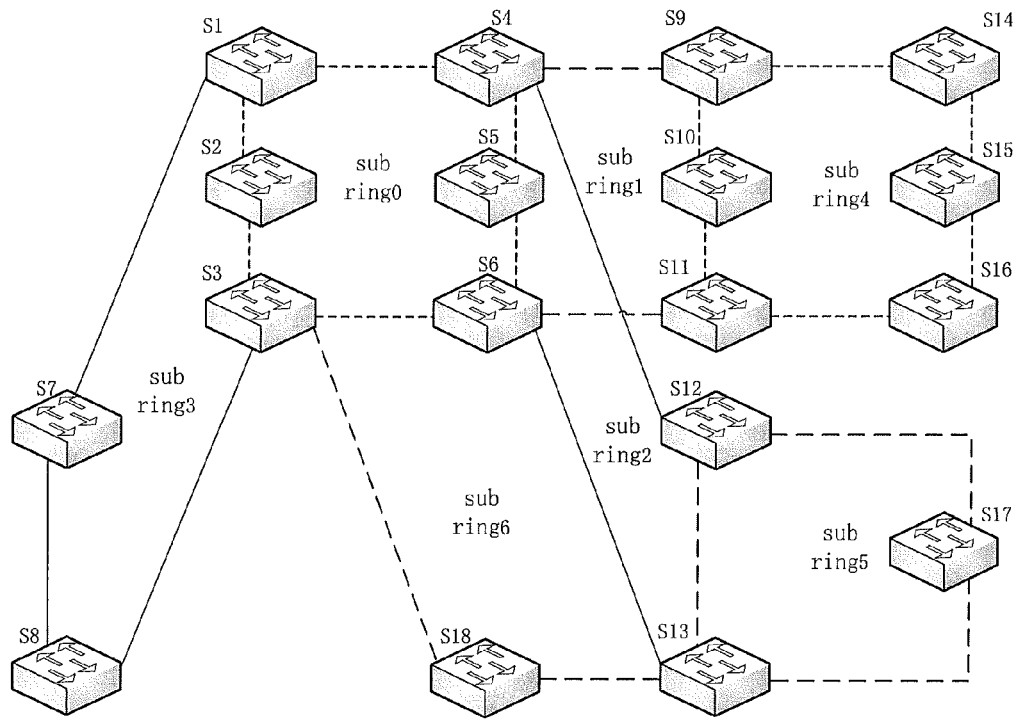
FIG. 6 is the specific application of the third embodiment of the present invention using the method of logic definition of the sub ring in the topological structure of complicated multiple rings.

This embodiment is a specific application of using the method of logic definition of sub rings in the topological structure of complicated multiple rings. The topological structure of the Ethernet multiple rings is the same as that in FIG. 5a of Embodiment 2, a method for dividing the logic of the sub rings is used, but the hierarchical relation is not considered when dividing the sub rings, the shared path belongs to any sub ring among a plurality of sub rings adjacent thereto, as shown in FIG. 6, the link included by sub ring 0 is S1-S2-S3-S6-S5-S4-S1; the links included by sub ring 1 are S4-S9 and S6-S11, and the shared path of sub ring 1 with sub ring 0, i.e., S4-S5-S6, belongs to ring 0, and the shared path of sub ring 1 with sub ring 4, i.e., S9-S10-S11, belongs to sub ring 4, but nodes S4 and S6 belong to sub ring 0, sub ring 1 and sub ring 2 at the same time, nodes S9 and S11 belong to sub ring 1 and sub ring 4 at the same time; the link included by sub ring 4 is S9-S10-S11-S16-S15-S14-S9; the link included by sub ring 3 is S1-S7-S8-S3; the link included by sub ring 6 is S3-S18-S13; the links included by sub ring 2 are S4-S12, S6-S13, and the shared path of sub ring 2 with sub ring 0, i.e., S4-S5-S6, belongs to sub ring 0, and the shared path of sub ring 2 with sub ring 5, i.e., S12-S13, belongs to sub ring 5; and the sub ring 5 includes the link S12-S17-S13-S12. The links included by each ring in the figure are represented by different broken lines or solid lines.

Still according to the situation of the master nodes and ring protecting links as assumed in the second embodiment, when all the links are normal, and there is service data being transmitted from the node S1 to S17, the unique path for transmitting the service data is S1-S2-S3-S6-S13-S12-S17.

Assume that link S3-S6 is failed, the link belongs uniquely to sub ring 0, the master node 51 of sub ring 0 unblocks the ring protecting link S1-S4, at this moment, the unique path for transmitting the service data from S1 to S17 is S1-S4-S5-S6-S13-S12-S17.

Assume that link S6-S13 is failed, the link belongs uniquely to sub ring 2, the master node S12 of sub ring 2 unblocks the ring protecting link S4-S12, at this moment, the unique path for transmitting the service data from S1 to S17 is S1-S2-S3-S6-S5-S4-S12-S17.

It can be seen that no matter how to divide the logic areas, it only needs to ensure that one link belongs uniquely to one logic area, when a link is failed, the ring protecting link of the logic area to which the link belongs is unblocked, there is only a unique link communicating between two nodes for transmitting the service data, which avoids the occurrence of a super loop.

The Fourth Embodiment

This embodiment uses the method of logic definition of priorities, when defining the logic areas of the Ethernet multiple rings, each logic area is a complete single ring, and different priorities are also defined. After defining the logic areas of the Ethernet multiple rings in this way, each link may belong to a plurality of logic areas. When a link is failed, if the link is in an unblock state before it is failed, it will only result in that the ring protecting link of the logic area with the highest priority is unblocked, but will not make the ring protecting links of a plurality of logic areas unblocked which leads to a "super loop"

Figure 7:
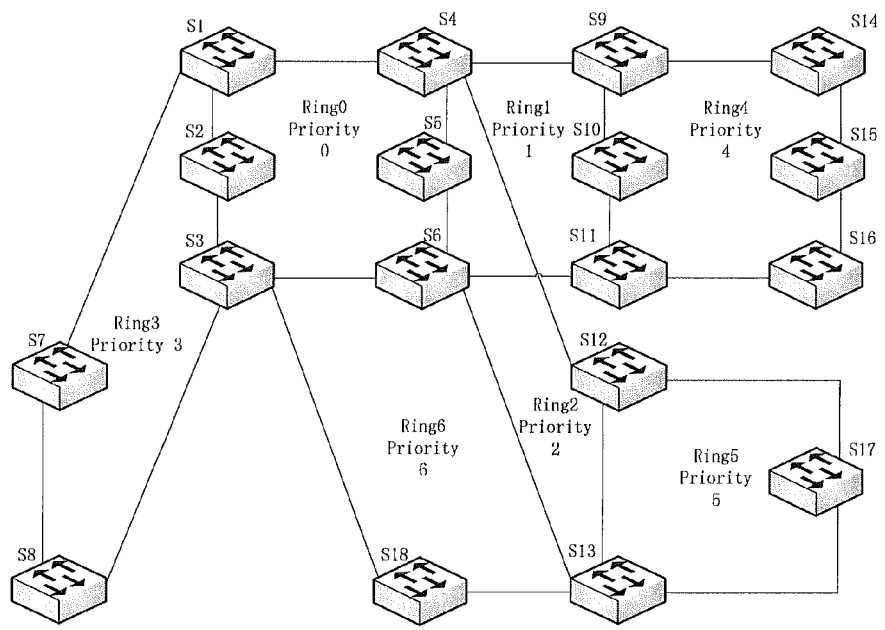
FIG. 7 is the specific application of the fourth embodiment of the present invention using the method of logic definition of priorities in the topological structure of complicated multiple rings.

The topological structure of the Ethernet multiple rings is the same as that in FIG. 5a of the application Embodiment 2, a method of logic definition of priorities is used. The bigger the number of the priority is, the lower the priority is. As shown in FIG. 7, the priority of ring 0 is 0, and ring 0 is a complete single ring; the priority of ring 1 is 1 and ring 1 is a complete single ring; the priority of ring 2 is 2 and ring 2 is a complete single ring; the priority of the ring 3 is 3 and ring 3 is a complete single ring; the priority of the ring 4 is 4 and ring 4 is a complete single ring; the priority of the ring 5 is 5 and ring 5 is a complete single ring; and the priority of the ring 6 is 6 and ring 6 is a complete single ring. Link S4-S5 simultaneously belongs to ring 0, ring 1 and ring 2, when link S4-S5 is failed, if the link is in an unblock state before it is failed, since the priority of ring 0 is the highest, it will at most result in that the ring protecting link of ring 0 is unblocked, but will not result in that the ring protecting links of ring 1 and ring 2 are unblocked which forms a "super loop". The present embodiment seems to be inconsistent with the principle of the invention that "each link only has a unique logic area to which it belongs", but in fact, the embodiment is an application of the present invention after being modified, which conforms to the feature of the present invention, namely, "when a link is failed, at most the ring protecting link in one logic area is unblocked, but the situation of the 'super loop' due to the unblocking of the ring protecting links of a plurality of logic areas will not occur".

The priority division in this embodiment is only an example. The priorities are divided dependent upon the requirements as long as the priorities of each logic areas are ensured to be different.

Of course, the present invention may have other embodiments, those skilled in the art, without departing from the spirit and essence of the present invention, can correspondingly make various alterations and changes according to the present invention, and the scope defined in claims shall comprise these corresponding alterations and changes.

INDUSTRY APPLICATION

The present invention can be used not only for a simple multi-ring network but also for a complicated multi-ring network, ultimately solves the failure of the "super loop" caused by the unblocking of a plurality of ring protecting links due to the failure of one link, and improves the anti-fault capability of the Ether multi-ring network.

What is claimed is:

1. A method for preventing a network storm from presenting in a multi-ring Ethernet, wherein the multi-ring Ethernet includes a plurality of nodes and a plurality of links, each link connecting one node to another node, the method comprising:

dividing the multi-ring Ethernet into a plurality of single rings, each single ring defining a logic area, the logic area being associated with a set of nodes, a set of links connecting the set of nodes, and the set of links including a ring protecting link; and upon detection of a failed link in the multi-ring Ethernet:

identifying, among the plurality of single rings, a single ring as being associated with the failed link;

determining, for the identified single ring, a logic area and a ring protecting link associated with the logic area; and unblocking the ring protecting link;

wherein at most one ring protecting link is unblocked, and one link in the multi-ring Ethernet is uniquely protected by one logic area logically, or wherein at most one ring protecting link is unblocked, shared link belongs to a plurality of logic areas, but the priorities of the logic areas are different and the shared link is protected by the logic area with the highest priority.

2. The method according to claim 1, wherein each link in the multi-ring Ethernet belongs uniquely to one logic area that has a master node to which a ring protecting link, of the logic area is connected, and in response to a link failure in the logic area, the master node is configured to unlock the ring protecting link.

3. The method according to claim 2, wherein a shared link between two adjacent single rings is assigned to one single ring thereof, wherein the closed single ring is a master ring, the unclosed single ring is a sub ring, and both the master ring and the sub ring are called logic areas.

4. The method according to claim 1, wherein each link in the multi-ring Ethernet respectively belongs to multiple logic areas, each logic area is set with a priority, in response to a link failure, the multiple logic, areas associated with the failed link are identified, the ring protecting link of one logic area which contains the failed link and has a highest priority among the multiple logic areas is unblocked by the master node of the logic area.

5. The method according to claim 4, wherein each single ring in the multi-ring Ethernet is one logic area, and each logic area has a different priority.

6. The method according to claim 1, wherein when the failed link is the ring protecting link of a logic area, the master node of the logic area to which the failed link belongs does not perform any operation.

7. A system for preventing a network storm from presenting in a multi-ring Ethernet, the multi-ring Ethernet comprising a plurality of nodes and all nodes are connected with each other by links, the system comprising:

means for dividing the multi-ring Ethernet into a plurality of single rings, each single ring defining a logic area and the logic area is associated with a set of nodes and a set of links connecting the set of nodes, the set of links including a ring protecting link; and means for, upon detection of a failed link in the multi-ring Ethernet:

identifying, among the plurality of single rings, a single ring as being associated with the failed link;

determining, for the identified single ring, a logic area and a ring protecting link associated with the logic area; and unblocking the ring protecting link;

wherein at most one ring protecting link is unblocked, and one link in the multi-ring Ethernet is uniquely protected by one logic area logically, or wherein at most one ring protecting link is unblocked, shared link belongs to a plurality of logic areas, but the priorities of the logic areas are different and the shared link is protected by the logic area with the highest priority.

8. The system according to claim 7, wherein each link in the multi-rings Ethernet belongs uniquely to one logic area that has a master node to which a ring protecting link of the logic area is connected, and in response to a link failure in the logic area, the master node is configured to unlock the ring protecting link.

9. The system according to claim 8, wherein a shared link between two adjacent single rings is assigned to one single ring thereof, wherein the closed single ring is a master ring, the unclosed single ring is a sub ring, and both the master ring and the sub ring are called logic areas.

10. The system according to claim 7, each link in the multi-ring Ethernet respectively belongs to multiple logic areas, each logic, area is set with a priority, the two nodes connected by the link record the logic areas to which they belong and the priorities of the logic areas respectively; in response to a link failure, the multiple logic areas associated with the failed link are identified, the master node of one logic area which contains the failed link and has a highest priority among the multiple logic areas unblocks the ring protecting link of the logic area.

11. The system according to claim 10, wherein each single ring in the multi-ring Ethernet is one logic area, and each logic area has a different priority.

12. The method according to claim 2, wherein when the failed link is the ring protecting link of a logic area, the master node of the logic area to which the failed link belongs does not perform any operation.

13. The method according to claim 3, wherein when the failed link is the ring protecting link of a logic area, the master node of the logic area to which the failed link belongs does not perform any operation.

14. The method according to claim 4, wherein when the failed link is the ring protecting link of a logic area, the master node of the logic area to which the failed link belongs does not perform any operation.

15. The method according to claim 5, wherein when the failed link is the ring protecting link of a logic area, the master node of the logic area to which the failed link belongs does not perform any operation.

* * * * *